(12) United States Patent
Udall

(10) Patent No.: US 8,100,638 B2
(45) Date of Patent: Jan. 24, 2012

(54) CENTERING DEVICE

(75) Inventor: Kenneth F. Udall, Ilkeston (GB)

(73) Assignee: Rolls-Royce PLC, London (GB)

( * ) Notice: Subject to any disclaimer, the term of this patent is extended or adjusted under 35 U.S.C. 154(b) by 469 days.

(21) Appl. No.: 12/457,248

(22) Filed: Jun. 4, 2009

(65) Prior Publication Data
US 2010/0014968 A1    Jan. 21, 2010

(30) Foreign Application Priority Data

Jul. 15, 2008    (GB) .................................. 0812832.4

(51) Int. Cl.
    *F01D 5/02*     (2006.01)
(52) U.S. Cl. .................................... 415/133; 416/244 A
(58) Field of Classification Search .................. 415/119, 415/140, 229, 231, 133, 216.1, 232; 416/244 A; 29/889.2, 407.09, 407.1
See application file for complete search history.

(56) References Cited

U.S. PATENT DOCUMENTS

| | | |
|---|---|---|
| 5,791,789 A | 8/1998 | Van Duyn et al. |
| 2003/0039538 A1 | 2/2003 | Allmon et al. |
| 2003/0182926 A1 | 10/2003 | Plona et al. |
| 2005/0220384 A1 | 10/2005 | Plona |
| 2008/0181763 A1* | 7/2008 | Webster et al. .................. 415/9 |

* cited by examiner

*Primary Examiner* — Edward Look
*Assistant Examiner* — Adam W Brown
(74) *Attorney, Agent, or Firm* — Oliff & Berridge, PLC

(57) ABSTRACT

A gas turbine engine (10) comprising a rotating member (16), a support structure (22) and a centering device (30), the centering device (30) centers the rotation of the rotating member (16) which is supported within the support structure (22), characterized in that the device includes a first member (34) and a second member (36) that contact one another, one of the first and second members (34, 36) extending from the rotating member and the other of the first and second members (34, 36) extending from the support structure (22), the first member (34) comprises a biasing surface (46) and the second member (36) comprises a seating surface (40), the device requiring a predetermined force to be applied to move between a centered condition and a first out of center condition and in the centered condition the first member (34) is seated against the seating surface (40) of the second member (36), and in the first out of center condition the first member contacts the biasing surface (46) which is arranged to provide a biasing force to bias the device to the centered condition.

20 Claims, 4 Drawing Sheets

CENTERING DEVICE

The present invention relates to a centering device.

During operation, it is known for rotating members to develop off centre or orbital rotation rather than centered rotation. Such rotation can occur because of damage to the rotating member. Potentially the off centre or orbital rotation can lead to further damage occurring. For example, ducted fan gas turbine engines conventionally comprise a core engine which drives a comparatively large diameter propulsive fan positioned at the upstream end of the core engine. The fan is thus vulnerable to damage as a result of foreign object ingestion by the engine. In most cases, the fan is sufficiently robust to withstand the effects of such foreign object ingestion without suffering major damage and is able to continue operating, although, perhaps at reduced efficiency.

On very rare occasions, the fan may be damaged to such an extent that parts of one or more of the aerofoil blades that make up the fan are lost. This usually necessitates the shutting down of the engine involved to minimise the hazard to the aircraft carrying it. However, the imbalance in the fan created by the blade loss generates extremely high loads which must be at least partially absorbed as the engine is run down to wind milling speed. Wind milling speed is the speed at which the engine rotates in a non operative condition as a result of its motion through the atmosphere.

One way in which fan imbalance load absorption can be achieved is by the use of fuse pins or fuse bolts. Typically the main bearing supporting the shaft carrying the fan is radially connected to the remainder of the engine structure via a plurality of axially extending fuse pins. In the event of major fan imbalance, the resultant high radial loads cause the fuse pins to fracture in shear and allow the fan and its shaft to orbit about the engine's longitudinal axis. This continues as the engine is allowed to run down to wind milling speed. Unfortunately, under certain circumstances the vibration resulting from fan imbalance which still exists at wind milling speed can still be extremely severe. This is due mainly to the natural frequency of vibration of the fan and the reduced stiffness of the fused structure supporting the fan assembly.

Various arrangements have been proposed to re-centre the rotation of the fan assembly. In one such arrangement, a radially outwardly projecting thread is provided on the fan assembly which engages with a fixed thread mounted to the engine structure. As the fan assembly rotates orbitally, the thread on the fan assembly precesses along the fixed thread which has a decreasing diameter and thus progressively centres the rotation of the fan assembly. However, more recent engines tend to have much larger orbits and energies, requiring greatly enlarged threads. The larger orbits and energies lead to faster centering of the fan assembly which is disadvantageous, as the fan assembly is centered while still having a high energy.

According to a first aspect of the present invention, there is provided a gas turbine engine comprising a rotating member, a support structure and a centering device, the centering device centres the rotation of the rotating member which is supported within the support structure, the device includes a first member and a second member that contact one another, one of the first and second members extending from the rotating member and the other of the first and second members extending from the support structure, the first member comprises a biasing surface and the second member comprises a seating surface, the device requiring a predetermined force to be applied to move between a centered condition and a first out of centre condition and in the centered condition the first member is seared against the searing surface of the second member, and in the first out of centre condition the first member contacts the biasing surface which is arranged to provide a biasing force to bias the device to the centered condition.

Possibly, the rotating member comprises the first member and the support structure comprises the second member. Alternatively the rotating member comprises the second member and the support structure comprises the first member.

Possibly, the second member includes a pair of arms, which may define an interior therebetween. Possibly, the arms are resiliently biased towards a closed position.

Possibly, in the first out of centre condition the biasing surface is at least partially received within the interior, forcing the arms apart from the closed position, the engagement of the arms and the biasing surface providing the biasing force.

Possibly, the biasing surface is arranged so that as the biasing surface progressively moves into the interior the biasing force increases. The biasing surface may include first and second biasing surfaces which may be angled relative to each other. Each of the first and second biasing surfaces may contact one of the arms in the first out of centre condition. The biasing surfaces may subtend an angle of between 15° and 30° therebetween, and may subtend an angle of between 20° and 25° therebetween.

The first member may include a pair of seating surfaces that extend radially outwardly from the biasing surfaces.

The first member seating surfaces may extend radially outwardly from the biasing surfaces, and in the centered condition may seat against the seating surfaces of the second member. The first member seating surfaces may be angled relative to each other, and may subtend an angle of 140° to 160°, and may subtend an angle of substantially 150°. The first member seating surfaces may meet to form an edge.

Possibly, the second member seating surfaces are angled relative to each other, and the angle therebetween may correspond with the angle between the first member seating surfaces.

The first member may include a pair of friction surfaces, which may extend radially inwardly from the biasing surfaces. Possibly the friction surfaces are substantially mutually parallel. Possibly in a second out of centre condition, the arms engage the friction surfaces.

Possibly the first and/or the second member is in the form of an annulus. Alternatively, one of the first or second members may be in the form of an annulus, and the other of the first or second members may be in the form of an interrupted annulus, which may comprise at least three parts.

Possibly the rotating member is a shaft of the gas turbine engine.

According to a third aspect of the present invention, there is provided a method of centering the rotation of a rotating member, the method including the step of providing a device for centering the rotation of a rotating member as defined in any of the said preceding statements.

Embodiments of the present invention will now be described, by way of example only, with reference to the accompanying drawings, in which.

Figure 1:
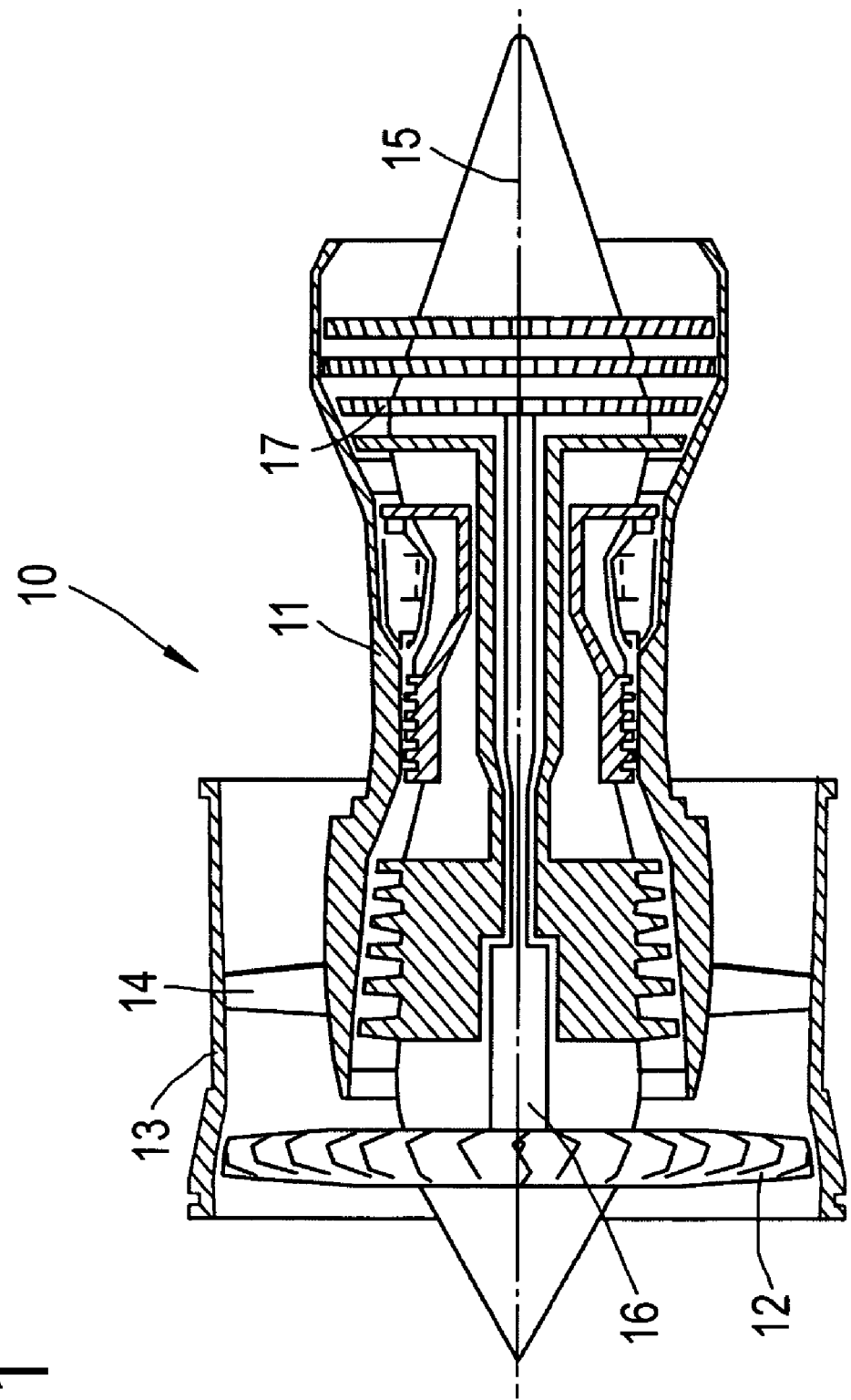
FIG. 1 is a schematic side cross section view of a ducted fan gas turbine engine.

Referring to FIG. 1, a ducted fan gas turbine engine 10 is of mainly conventional construction and comprises a core engine 11 which functions in a conventional manner to drive a propulsive fan 12 positioned at the upstream end of the core engine 11 (the term upstream as used herein is with respect to the general direction of gas flow through the engine 10, that is, from left to right as viewed in FIG. 1). The propulsive fan 12 is positioned within a fan casing 13 which is supported from the core engine 11 by an annular array of outlet guide vanes 14. The ducted fan gas turbine engine 10 has a longitudinal axis 15 about which its major rotational parts rotate. The fan 12 is mounted on a shaft 16 which under normal circumstances, is coaxial with the engine longitudinal axis 15 and which is driven in a conventional manner by the low pressure turbine portion 17 of the core engine 11.

Figure 2:
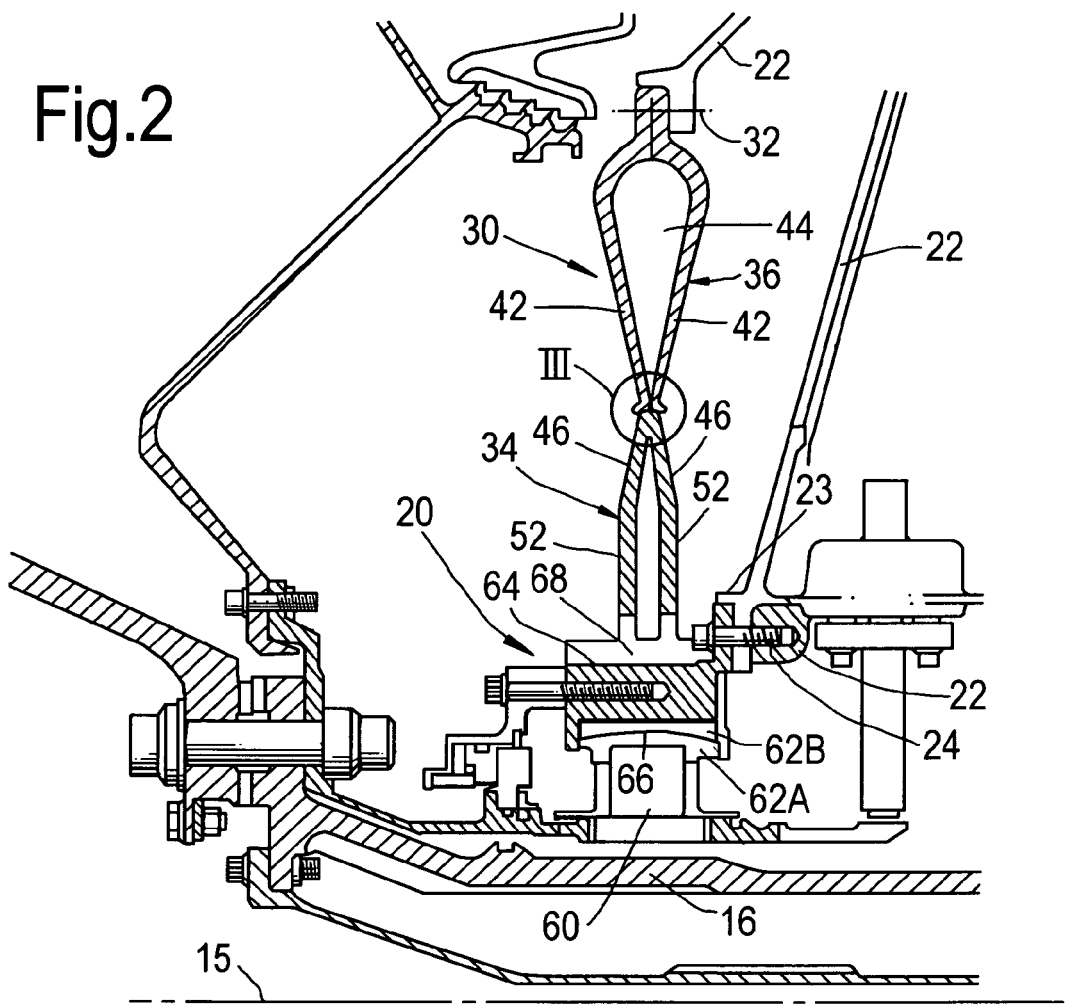
FIG. 2 is a cross sectional side view of a part of the bearing support structure for the upstream end of the fan shaft of the ducted fan gas turbine engine shown in FIG. 1.

FIG. 2 shows in cross section a detail of the upstream region of the fan shaft 16, with the fan shaft 16 operating in a normal, centered condition, rotating around the axis 15. The engine 10 includes a bearing assembly 20 which projects outwardly from the shaft 16, the bearing assembly 20 including a roller bearing 60 which is retained within a radially outer track 62 which is split into an inner track part 62A and an outer track part 62B, the radially outer track 62 being supported by a flanged ring 64 which is fixed to the engine structure 22 by a plurality of fuse bolts 24 within a spigot 23. The split line 66 between the inner part of the outer track 62A and the outer part of the outer track 62B is curved convexly radially outwardly.

The engine 10 includes a centering device 30, the centering device 30 including a first member 34 having a cross sectional shape generally in the form of a wedge, and which projects radially outwardly from the flanged ring 64 of the bearing assembly 20. The first member 34 could be hollow. The first member 34 includes, at the radially outer tip, a pair of seating surfaces 38 which are angled relative to each other, the angle subtended by the seating surfaces 38 being indicated in FIG. 3 by the reference numeral 48. In one example, the angle 48 could be between 140° and 160°, and in another example the angle could be approximately 150°. The two seating surfaces 38 meet at an edge 50.

Extending radially inwardly from the first member seating surfaces 38, the first member 34 includes a pair of biasing surfaces 46. The biasing surfaces 46 are angled relative to each other, the angle subtended between the surfaces 46 being indicated in FIG. 3 by the reference numeral 54. In one example, the angle 54 could be between 15 and 30°. In another example, the angle could be between 20° and 25°, and optimally could be 22°.

The first member 34 includes a pair of friction surfaces 52 which extend radially inwardly from the biasing surfaces 46 towards the flanged ring 64. The friction surfaces 52 are substantially mutually parallel.

The centering device 30 includes a second member 36 which is fixed to the engine structure 22 by means of bolts indicated in FIG. 2 by lines 32, the second member 36 extending from the fixed structure 22 radially inwardly to the first member 34. The second member 36 includes a pair of arms 42 which define an interior 44 therebetween. In shape, the arms 42 extend outwardly around the interior 44 and then converge radially inwardly to meet together at the radially innermost extremity, each arm 42 having an out turned lip 43 at the radially innermost extremity, each lip 43 including a seating surface 40. The second member seating surfaces 40 are angled relative to each other, the angle corresponding with the angle 48 of the first member seating surfaces 38.

Figure 3:
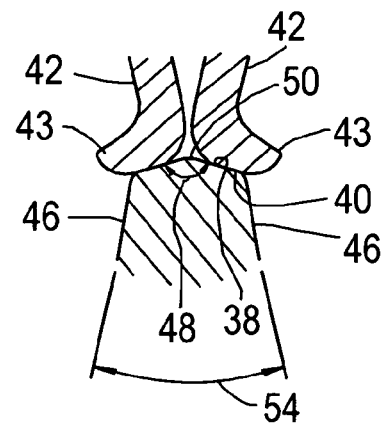
FIG. 3 is an enlarged detail view as indicated by the reference label III in FIG. 2.

In the centered condition as shown in FIGS. 2 and 3, each of the first member seating surfaces 38 engage one of the second member seating surfaces 40. The arms 42 are formed of a resilient material, which biases the arms 42 to a closed position. In the centered condition, the centering device 30 is arranged so that the first member 34 causes the arms 42 to be spaced slightly apart, so that positive location is maintained despite manufacturing tolerances and the effect of wear over time.

In the centered condition, the rotation of the shaft 16 is steady and substantially constant around the axis 15. The engine structure 22, the centering device 30, the radially outer track 62 and the flanged ring 64 are fixed relative to the rotation of the shaft 16.

In the event of the fan 12 suffering damage which places it significantly out of balance, considerable radial loads are transmitted from the fan shaft 16 to the flanged ring 64 via the roller bearing 60. These loads are then in turn transmitted to the core engine fixed structure 22 via the fuse bolts 24. In order to protect the core engine 11 from being seriously damaged by the loads, the spigot 23 and the fuse bolts 24 are designed to fracture in shear when subjected to loads of a predetermined magnitude. When this happens, the upstream end of the fan shaft 16 no longer has radial support, and proceeds to orbit around the axis 15. In this event, fuel flow to the engine 10 is discontinued, and the fan 12 is allowed to run down to wind milling speeds. At wind milling speeds there is a possibility that the fan 12 will approach its fused natural frequency, which can result in severe vibrations which may threaten the integrity of the engine 10 or indeed the integrity of the aircraft carrying the engine.

In an out of centre condition, the shaft 16 continues to rotate, but follows an orbit around the axis 15. Initially, the resilient property of the arms 42 provides some resistance to movement of the shaft 16 from the centered condition to the out of centre condition. The force required to move the device 30 from the centered condition to a first out of centre condition can be predetermined. When a force is applied which is greater than the predetermined force, the arms 42 are forced apart by the first member 34 and the first member 34 enters the interior 44. As it does so, the arms 42 engage the biasing surfaces 46 in the first out of centre condition, the wedge shape of the biasing surfaces 46 providing an increasing friction resistance in combination with the biasing force of the arms 42, so that the frictional resistance increases as the first member 34 progressively enters the interior 44.

Figure 4:
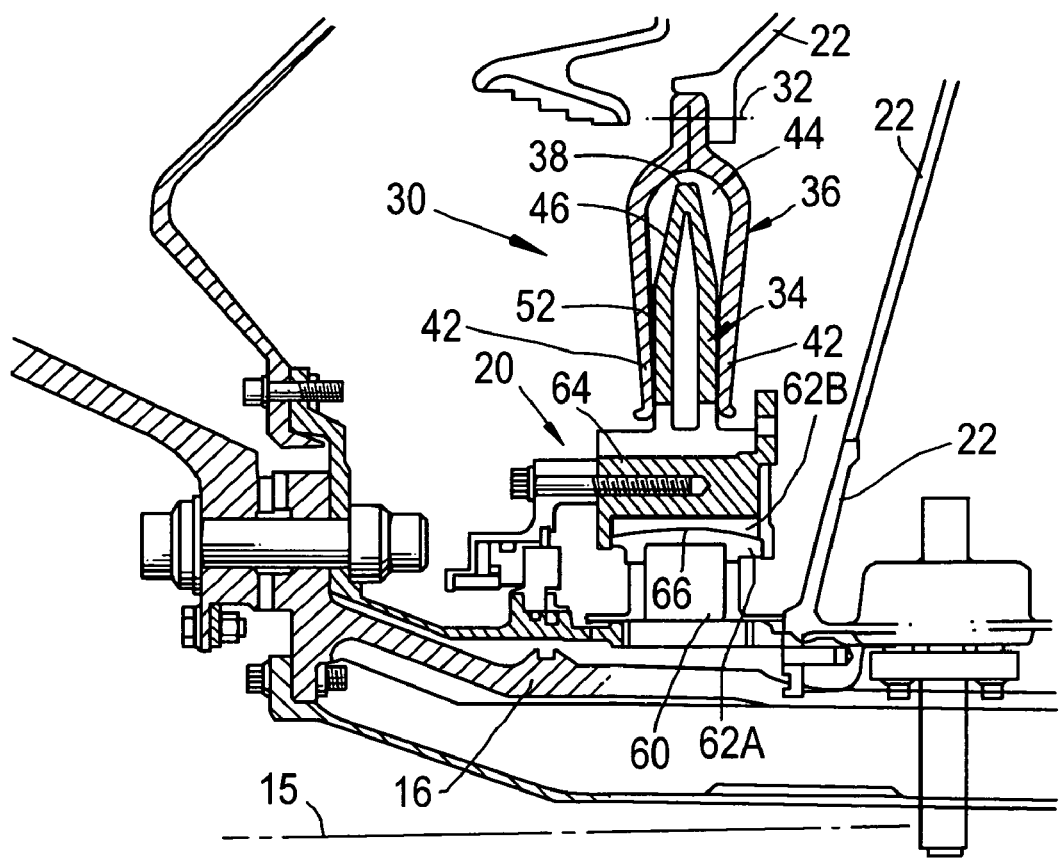
FIG. 4 is a view similar to that shown in FIG. 2 with the fan assembly in an out of centre condition.
Figure 5:
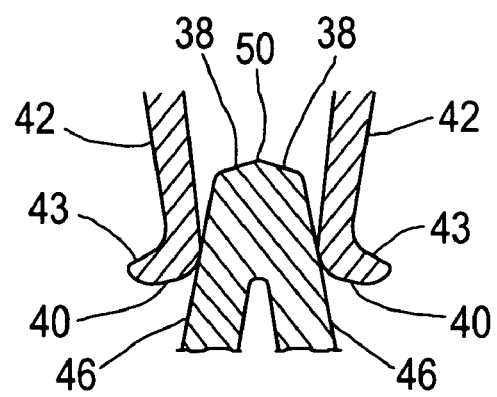
FIG. 5 is an enlarged detail similar to that of FIG. 3 with the fan assembly in another out of centre condition.

As the arms 42 reach the junction between the biasing surfaces 46 and the friction surfaces 52, the frictional resistance to the outwardly radial movement is reduced as the angles of the surfaces in contact with the arms 42 change, until the position shown in FIG. 4 is reached. In this position, the first member 34 has substantially fully entered the interior 44 and the shaft 16 has reached its maximum deflection from the axis 15. The curved split line 66 between the inner part 62A of the outer track and the outer part 62B of the outer track permits articulation of the flanged ring 64 and the first member 34 relative to the shaft 16, permitting the first member 34 to remain in engagement with the second member 36.

In the first out of centre condition, the arms 42 are in contact with the biasing surfaces 46. In a second out of centre condition, the arms 42 are in contact with the friction surfaces 52.

As the shaft 16 continues its orbital movement, different annular parts of the first member 34 could be moving into, within and out of the interior 44. During this movement, the frictional forces between the arms 42, and the biasing surfaces 36 and the friction surfaces 52, help to dissipate the energy of the shaft 16. As the energy of the shaft 16 is dissipated, there will come a point when the orbital motion is moving the arms 42 along the biasing surfaces 46. In this condition, the angled biasing surfaces 46 will act to bias the shaft 16 towards the centered condition. This may be assisted by providing friction surfaces 52 that curve concavely so that the first member 34 is wider at its junction with the flanged ring 64 than at its junction between the biasing surfaces 46 and the friction surfaces 52. This shape will also prevent the first member seating surfaces 38 from contacting the closed end of the interior 44 with excessive force, and the arms 42 from hitting the flanged ring 64 with excessive force. At some point, the movement of the shaft 16 could cause the first member 34 to withdraw completely from the interior 44, at which point the arms 42 will spring shut to a closed position. If the energy of the shaft 16 has dissipated sufficiently so that the out of balance force is less than the predetermined force, the shaft 16 will then remain in the centered condition. In this condition, the orbital motion of the shaft 16 is eliminated, and the fan ceases to vibrate at what was its natural frequency and is now free to continue wind milling without exhibiting excessive vibration characteristics.

Thus the centering device 30 of the present invention permits the fan shaft 16 to orbit while it runs down to wind milling speed following major fan damage, but stops that orbiting at wind milling speeds, thereby avoiding undesirable vibration from the fan 12.

FIG. 2, the flanged ring 64 defines a plurality of access holes 68 which permit access to the fuse bolts 24, and also allow the extraction of manufacturing debris such as powder from the hollow interior of the first member 34.

In the out of centre conditions, axial retention of the bearing assembly 20 is provided by the radial overlap of the lips 43 over the first member seating surfaces 38. In one example, the lips 43 could be extended to provide more radial overlap.

The different orientations of the surfaces of the first member 34 provide a device 30 which offers a high resistance to outward radial movement when the shaft 16 is in the centered condition, a progressively increasing resistance when the shaft 16 is in an orbit with a medium radius, and a relatively lower resistance when the shaft 16 is in orbit with a large radius.

The device 30 of the present invention provides the advantage that it is tolerant of the shape of the orbit, the time of the orbit and the force characteristic of the orbit. For example, if early very eccentric orbits pull the first member 34 completely out of the interior 44 of the second member 36, the arms 42 will snap to the closed position, but will immediately be forced open again under the high speed orbit force. If a late inverted "mass centered" orbit decays so that the arms 42 are moving along the biasing surfaces 46 during the orbiting movement, the biasing surfaces 46 will bias the shaft 16 to the centered condition, but in the centered condition, the increased stiffness will raise the reversion (to stiffness centered) frequency, because of the energy still retained by the shaft 16, which will result in a larger orbit radius.

In the centered condition, as long as the out of balance force stays below the predetermined value at which the first member 34 forces the arms 42 of the second member 36 apart, the shaft 16 will stay in the centered condition. However, if the out of balance force then increases and exceeds the said predetermined value, which may occur for example due to a high speed dive, loss of further blading, or another event, the centering device 30 will again operate as described above to limit the forces transferred into the engine structure 22 until the loads and orbits decay and the shaft 16 is again in the centered condition. Thus the centering device 30 automatically resets so that it can be used repeatedly as required.

The centering device 30 of the present invention provides the advantage that the wear which occurs during the orbital rotational movement of the shaft 16 occurs on the biasing surfaces 46 and the friction surfaces 52 of the first member 34 and on the interior surfaces of the arms 42, rather than the seating surfaces 38, 40 of the first and second members 34, 36 respectively, which could affect the predetermined value and thus alter the operational characteristic of the device 30.

The angles 48 of the seating surfaces 38, 40 could be adjusted to increase or reduce the predetermined force required to open the arms 42 to move from the centered condition to the first out of centre condition.

The biasing of the arms 42 of the second member 36 ensures that the heads of the fuse bolts 24 cannot enter the interior 44, which could compromise the operation of the centering device 30.

Figure 6:
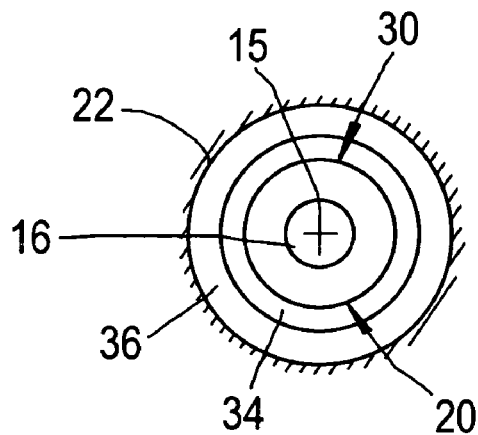
FIG. 6 is a schematic cross section.

FIG. 6 shows in schematic form a cross section taken across the axis 15. In this example, the first member 34 and the second member 36 are each in the form of a complete annulus between the engine structure 22 and the bearing assembly 20.

Figure 7:
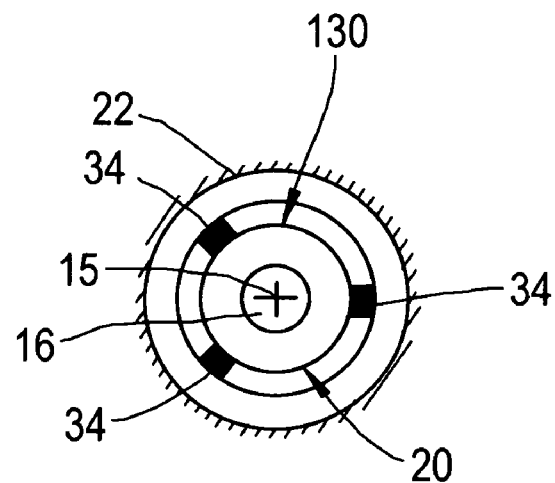
FIG. 7 and FIG. 8 are schematic cross sections similar to FIG. 6 showing alternative embodiments.

FIG. 7 shows an alternative embodiment in which a centering device 130 includes a first member 34 in the form of an interrupted annulus comprising three parts which extend radially outwardly from the bearing assembly 20 to the second member 36, which is in the form of a complete annulus.

Figure 8:
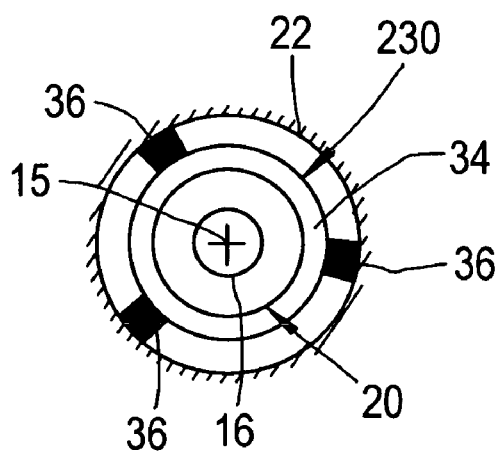

FIG. 8 shows a further embodiment in which a centering device 230 includes a first member 34 in the form of a full annulus, and a second member 36 in the form of an interrupted annulus including three parts which extend between the first member 34 and the engine structure 22.

Various other modifications could be made without departing from the scope of the invention. For example, the centering device has been shown and described with reference to use with a roller bearing, but could be used with other forms of bearings such as thrust ball bearings. As the device is axisymmetric, it could be applied to a low speed rotating component, for example to permit centering of a zig zag rotating to fixed seal contact, either on the rotating or static side.

In the examples shown and described, the profile of the first member 34 is shown as a triple ramp (fast, slow, parallel) with radiussed transitions. The first member seating surfaces 38, the biasing surfaces 46 and the friction surfaces 52 could be varied in angle, dimension and shape to permit force profile tuning. For example, the surfaces could be concave, flat or convex. The surfaces could have splined profiles. The width of the first member 34 is limited by bending stresses in the arms 42 (which are tapered to accommodate the bending stresses). Increasing the size of the second member 36, or using spring flange clamping, or using a more elastic material for the second member 36, could permit the use of a thicker wedge, providing a steeper ramp and a larger centering force.

The first member 34 is hollow and could potentially therefore spring inwards under the pinch loads applied by the second member 36, which could therefore offer a different profile as the location of the pinch moves. The surface roughness of the interior surfaces of the arms 42, of the first member seating surfaces 38, of the second member seating surfaces 40, of the biasing surfaces 46 and of the friction surfaces 52 could be varied to offer different frictional forces at different orbit radii.

There is thus provided a centering device which permits the centering of a rotating member. The device is mechanically relatively simple, is robust, and operates automatically, yet can be tailored to operate at predetermined force values. The device is tolerant of large orbits and energies.

The invention claimed is:

1. A gas turbine engine comprising a rotating member, a support structure and a centering device, the centering device centres the rotation of the rotating member which is supported within the support structure, characterised in that the device includes a first member and a second member that contact one another, one of the first and second members extending from the rotating member and the other of the first and second members extending from the support structure, the first member comprises a biasing surface and the second member comprises a seating surface, the device requiring a predetermined force to be applied to move between a centered condition and a first out of centre condition and in the centered condition the first member is seated against the seating surface of the second member, and in the first out of centre condition the second member contacts the biasing surface which is arranged to provide a biasing force to bias the device to the centered condition.

2. The device according to claim 1, in which the second member includes a pair of arms, which define an interior therebetween.

3. The device according to claim 2, in which the arms are resiliently biased towards a closed position.

4. The device according to claim 3, in which in the first out of centre condition, the biasing surface is at least partially received within the interior, forcing the arms apart from the closed position, the engagement of the arms and the biasing surface providing the biasing force.

5. The device according to claim 4, in which the biasing surface is arranged so that as the biasing surface progressively moves into the interior the biasing force increases.

6. The device according to claim 1, in which the biasing surface includes first and second biasing surfaces which are angled relative to each other.

7. The device according to claim 6, in which each biasing surface contacts one of the arms in the first out of centre condition.

8. The device according to claim 6, in which the biasing surfaces subtend an angle of between 15 and 30° therebetween.

9. The device according to claim 8, in which the biasing surfaces subtend an angle of between 20° and 25° therebetween.

10. The device according to claim 1, in which the first member includes a pair of seating surfaces that extend radially outwardly from the biasing surfaces.

11. The device according to claim 10, in which in the centered condition the first member seating surfaces seat against the seating surfaces of the second member.

12. The device according to claim 10, in which the first member seating surfaces are angled relative to each other and meet to form an edge, the first member seating surfaces subtend an angle therebetween of 140 to 160°.

13. The device according to claim 12, in which the first member seating surfaces subtend an angle of approximately 150°.

14. The device according to claim 12, in which the second member seating surfaces are angled relative to each other, and the angle therebetween corresponds with the angle between the first member seating surfaces.

15. The device according to claim 1, in which the first member includes a pair of friction surfaces, which extend radially inwardly from the biasing surfaces.

16. The device according to claim 15, in which the friction surfaces are substantially mutually parallel.

17. The device according to claim 15, in which the second member includes a pair of arms which define an interior therebetween and in which, in a second out of center condition, the arms engage the friction surfaces.

18. The device according to claim 1, in which the first and/or the second member is in the form of a complete annulus.

19. The device according to claim 1, in which one of the first or second members is in the form of a complete annulus, and the other of the first or second members is in the form of an interrupted annulus comprising at least three parts.

20. The device according to claim 1, in which the rotating member is a shaft of the gas turbine engine.

* * * * *